INVENTOR.
LEWIS C. WALKER
BY Williamson, Palmatier
& Bains
ATTORNEYS

Jan. 20, 1970    L. C. WALKER    3,490,275
METHOD AND APPARATUS FOR TESTING AN AUTOMOBILE AIR CONDITIONER
Filed Jan. 11, 1968    2 Sheets-Sheet 2
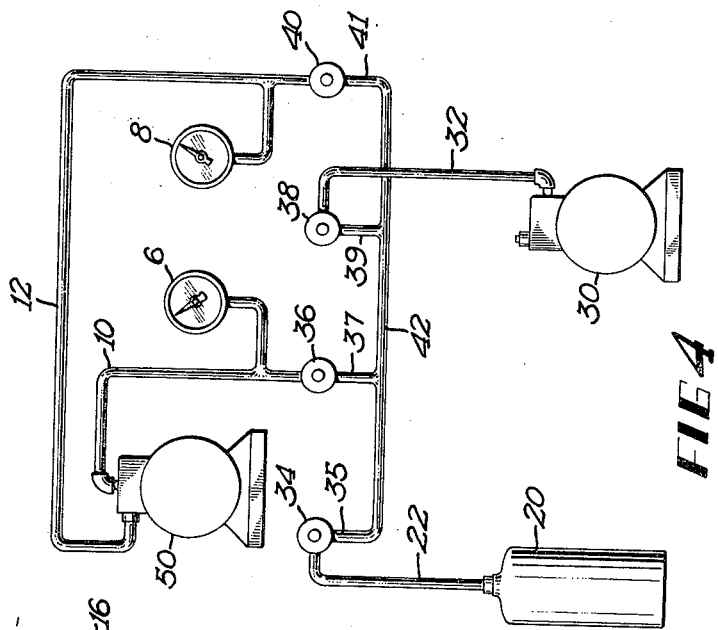
FIG. 4
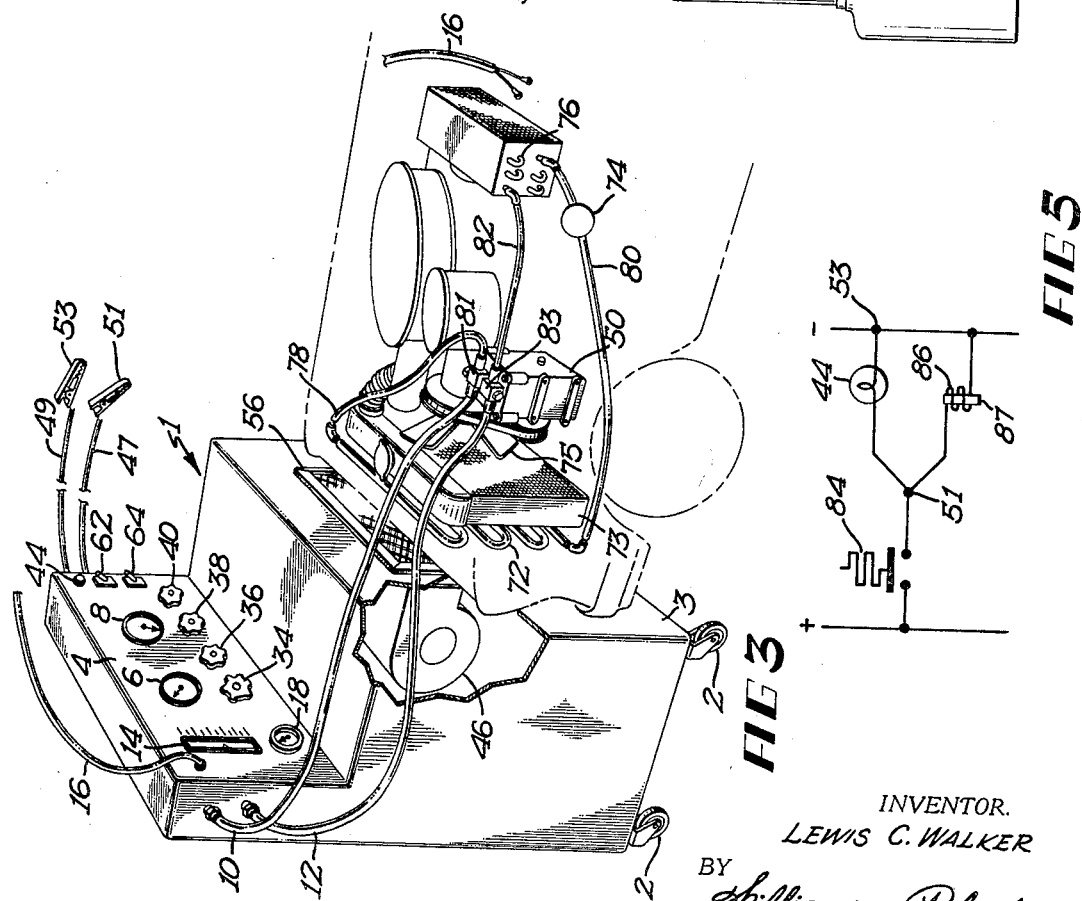
FIG. 3
FIG. 5
INVENTOR.
LEWIS C. WALKER
BY
Williamson, Palmatier
& Bains
ATTORNEYS

3,490,275
METHOD AND APPARATUS FOR TESTING AN AUTOMOBILE AIR CONDITIONER
Lewis C. Walker, R.R. 3, Waseca, Minn. 56093
Filed Jan. 11, 1968, Ser. No. 697,087
Int. Cl. G01n 15/08
U.S. Cl. 73—117.1                                6 Claims

ABSTRACT OF THE DISCLOSURE

A test stand for an automobile air conditioner houses one or more motor-driven blowers having discharge outlets so disposed that they may be positioned directly opposite the radiator grill of an automobile by moving the portable test stand adjacent thereto. A variable resistor in series with the blower motor permits the blower to be driven at different speeds so as to direct air streams of varying volumetric flow over an air-conditioner condenser located inside the radiator grill, thereby simulating the different conditions of condenser air flow which would be encountered when driving the automobile at different automobile road speeds. The test stand also houses pressure gauges, a thermostat, a temperature control indicating light, and refrigerant charging and evacuating means, all of which are provided with suitable connector lines for attachment to the automobile air conditioner for checking and servicing the air-conditioning apparatus.

---

The increasing use of air-conditioning units on automobiles is creating a growing problem of providing adequate means for properly and efficiently servicing such units. Tools such as pressure and temperature gauges, vacuum pumps, and charging cylinders are available; however, there is no known test apparatus which combines these tools in a compact assembly such that they may be readily adapted for correctly testing an automobile air conditioner.

In particular, there is presently available no test apparatus or procedure for checking the operation of an automobile air-conditioning system under the different conditions of condenser air flow which would normally be encountered when driving an automobile at varying road speeds.

SUMMARY OF THE INVENTION

With a view towards overcoming the aforesaid deficiencies now existing with respect to automobile air conditioner test arrangements, I have developed a unique test console and checking procedure which may be readily employed by a garage mechanic.

The air-conditioner test apparatus of this invention is particularly characterized by a portable test stand on which blower means are mounted at such a height and location as to be movable to a position in direct confronting relationship with an automobile radiator grill, behind which the condenser of the automobile's air-conditioning system is normally installed.

A particularly advantageous feature of my testing system resides in the utilization of a rheostat or variable resistor in series with the drive motor for the aforesaid blower means. The test stand also includes high and low pressure gauges with flexible hose connections for attachment to the high and low pressure sides of the automobile air conditioning circuit. By changing the position of the variable resistor so as to operate the blower means at different speeds and thereby directing air streams of varying volumetric flow over the air-conditioner condenser, the operation of the air-conditioning system under conditions simulating various automobile road speeds may be tested by reading the pressure gauges at each of the different air flow conditions.

The test console also houses a vacuum pump and a refrigerant charging cylinder. A manifold having a plurality of valved fittings is connected to the charging cylinder and vacuum pump as well as to the flexible hoses leading from the high and low pressure gauges. The manipulation of the appropriate valves on the test manifold permits refrigerant to be added to or evacuated from the air-conditioning circuit.

As a further advantageous feature, my test console incorporates a thermostat having thermocouple lead wires connected thereto, and a direct current indicating light having lead wires which may be connected to the direct current control circuit of the air conditioner. These devices are employed to check the operation of the air conditioner's control system, with the thermocouple being utilized to sense the temperature of the conditioned air being directed into the automobile passenger compartment.

These and other objects and advantages of my invention will become readily apparent as the following description is read in conjunction with the accompanying drawings, of which:

FIGURE 3 is a perspective view showing the test cabinet in the proper position adjacent the front of an automobile for testing air-conditioning apparatus mounted thereon;

FIGURE 4 is a schematic flow diagram showing the manner in which the vacuum pump, charging cylinder and pressure gauges mounted on the test stand may be connected to the compressor of an automobile air-conditioning system; and FIGURE 5 is a wiring diagram showing the manner of connecting an indicator light in the control circuit of an automobile air conditioner.

Figure 1:
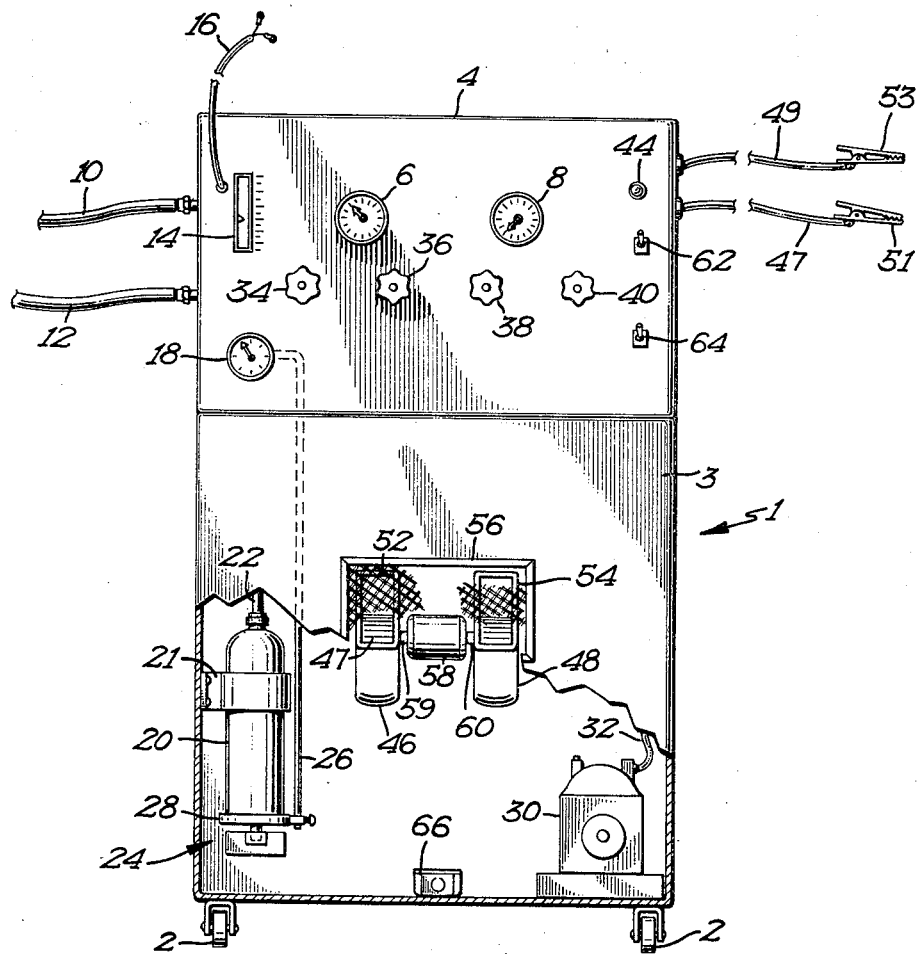
FIGURE 1 is a front elevation view, partially in section, showing my improved test apparatus.

The test apparatus of this invention has been particularly designed with the testing of automobile air conditioners in mind. A primary objective was to arrange a variety of testing and servicing tools on a portable stand in such a manner that the various procedures for checking an automobile air conditioner may be conveniently and quickly carried out. To this end, the test apparatus is compactly arranged on a portable test stand or cabinet 1 supported on rollers 2. The upper portion 4 of cabinet 1 is in the form of an indicator and control console having a plurality of guages, dials and switches mounted thereon. These devices consist of, first of all, high and low pressure gauges 6 and 8 which are connected to flexible hoses 10 and 12 for attachment to the suction or low pressure side and the discharge or high pressure side of a refrigeration system. Also included are a temperature scale 14 having thermocouple lead wires 16 extending therefrom, and a gauge 18 which indicates the pounds of refrigerant charged into an air-conditioning system from charging cylinder 20. Cylinder 20 is slidably supported for vertical movement within bracket 21 in the lower part of cabinet 1. A reserve supply of refrigerant such as refrigerant-12 is contained within cylinder 20, and may be charged into a refrigeration system through flexible hose 22 connected to the top thereof. In order that the person servicing an automobile refrigeration system may know the amount of refrigerant discharged into the refrigeration system, cylinder 20 is mounted on a scale generally indicated by numeral 24, and having a connecting rod 26 extending from the tray or pan portion 28 thereof to gauge 18. Thus, as refrigerant is dispensed from cylinder 20 the movement of scale tray 28 will be transmitted to gauge 18 by connecting rod 26. Gauge 18 is calibrated in pounds and resettable to a zero position so that the operator can easily tell at a glance how many pounds of refrigerant have been dispensed from cylinder 20 during each charging operation. Also housed in the bottom of cabinet 1 is a vacuum pump 30 having a flexible inlet hose 32 connected thereto.

Vacuum pump 30 and charging cylinder 20 are connected to flexible hoses 10 and 12 through a manifold 42, as shown in FIGURE 4, by means of hand valves 34, 36, 38 and 40 mounted on control console 4. With reference to FIGURE 4, it will be seen that flexible conduits 22 and 32 leading from cylinder 20 and vacuum pump 30 are connected to manifold 42 through fittings 35 and 39, and that valves 34 and 38 control the flow of refrigerant through these interconnecting passages. The connection of manifold 42 to flexible hoses 10 and 12 is accomplished by means of fittings 37 and 41, with flow through these fittings into the flexible hoses being controlled by hand valves 36 and 40. It is to be noted that pressure gauges 6 and 8 are connected to flexible hoses 10 and 12 upstream of valves 36 and 40 so that these gauges will register suction and discharge pressure whenever flexible hoses 10 and 12 are connected to an automobile, air-conditioning compressor 50.

Referring again to FIGURE 1, control console 4 also includes a direct current indicator light 44 having lead wires 47 and 49 with connector clamps 51 and 53 at the outer ends thereof. Light 44 is a continuity light which is utilized to check the operation of the air conditioner control system in a manner described below.

As a particularly important portion of my air conditioner test apparatus, I provide blower means in the lower portion of test cabinet 1. Either centrifugal or axial flow fans or blowers could be employed; however, I prefer to use a pair of centrifugal fans 46 and 48 having impeller blades 47. Fans 46 and 48 are shown with their discharge outlets 52 and 54 facing against panel 3 of cabinet 1, which is shown broken away in FIGURE 1. Discharge grill 56 in front panel 3 extends across fan discharge openings 52 and 54. Although a variety of drive arrangements for fans 46 and 48 could be employed, I prefer to use a single motor 58 mounted between fans 46 and 48 and having outwardly extending drive shafts 59 and 60 at the opposite ends thereof which are connected to the hubs of fans 46 and 48. The operation of motor 58 is controlled by switch 62 located on control console 4. Located below switch 62 is a separate switch 64 which controls the operation of motor-driven vacuum pump 30.

Figure 2:
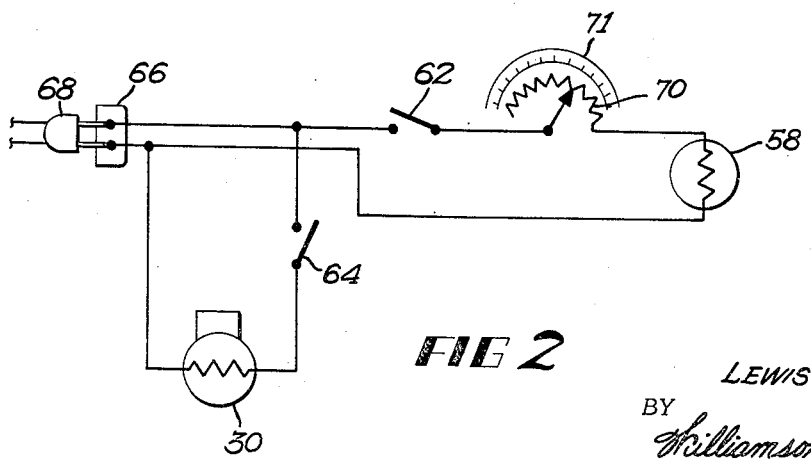
FIGURE 2 is a wiring diagram for the blower motor and vacuum pump of the test console.

The wiring circuit for blower motor 58 and motor-driven vacuum pump 30 is shown in FIGURE 2. A junction box 66 on the bottom of test cabinet 1 is connected to an external, 115-volt power source as by a plug 68. Vacuum pump 30 and blower motor 58 are connected in parallel with the power source in the manner shown, with switches 65 and 62 being connected in series with pump 30 and motor 58, respectively. Connected in series with blower motor 58 is a variable resistor or rheostate 70 which may be adjusted to various positions as indicated by scale 71 to vary the speed of blower motor 58. The function and purpose of variable resistor 70 will be more fully explained below in connection with the operation of my improved test apparatus.

In FIGURE 3, I have shown in phantom lines an automobile having a conventional air conditioning system comprised of compressor 50, condenser coil 72, expansion device 74, and evaporator coil 76. These components are connected in a closed refrigeration circuit by means of discharge line 78 leading from compressor 50, liquid line 80 connected between condenser 72 and evaporator coil 76, and suction line 82 leading from evaporator 76 to compressor 50. Refrigerant expansion device 74 may be either a thermostatic valve or a capillary tube. In order that the air conditioning system may be tested and serviced, test cabinet 1 is wheeled in front of the automobile with blower discharge grill 56 positioned in direct confronting relationship with the radiator grill of the automobile. The discharge sides or outlets 52 and 54 for blowers 46 and 48 and grill 56 are located at such a position and height in the front wall 3 of cabinet 1 that they will normally be at the same level as a radiator grill when cabinet 1 is moved in front of an automobile to be tested. Condenser coil 72 is normally located directly behind the front grill of the automobile in line with radiator 73. Thus, the operation of blowers 46 and 48 will cause a stream of air to flow over condenser coil 72 which is in addition to and supplemental to the air flow produced over coil 72 and radiator 73 by engine fan 75. Flexible hoses 10 and 12 are connected to discharge and suction valves 81 and 83, respectively, of compressor 50.

With test cabinet 1 positioned as shown in FIGURE 3, facing the front end of an automobile, and with flexible hose connections 10 and 12 connected to compressor 50 in the aforesaid manner, the test and servicing operation is begun by starting the automobile engine. Compressor 50 is conventionally belt-driven by the engine crank shaft, with the pulley wheel on the compressor being connected to the compressor drive shaft by a solenoid-actuated clutch. The energization of the clutch solenoid is normally controlled by a thermostat located in the automobile passenger compartment or in the air stream discharging from evaporator 76. FIGURE 5 shows a wiring diagram for such a control circuit. Thermostat 84 would normally be located at the outlet of evaporator 76 and is connected in series with compressor clutch solenoid 86. The reciprocal movement of plunger 87 of solenoid 86 serves to engage the compressor clutch. For the purpose of testing the operation of thermostat 84 and solenoid 86, lead clamps 51 and 53 of indicator light 44 are connected across the direct current control circuit in series with thermostat 84 and in parallel with solenoid 86 in the manner indicated in FIGURE 5. Thermocouple lead wires 16 of temperature indicator 14 are also located in the leaving air stream of evaporator 76. When the leaving air temperature rises above a predetermined level, thermostat 84 will sense this condition and close the contacts in the control circuit to solenoid 86, and light 44 will come on. By observing the temperature on scale 14 at which light 44 comes on, the operator may check to see if thermostat 84 is functioning to actuate the refrigerant compressor at the proper, predetermined set point. Compressor 50 should start running at the same instant that light 44 is eliminated, since light 44 and compressor-actuating solenoid 86 are in parallel. The test engineer can check to see if compressor 50 is running when light 44 comes on by observing suction pressure gauge 8. The suction pressure should drop sharply when compressor 50 starts operating. If it does not, this indicates that solenoid 86 or some portion of the clutch mechanism which actuates the compressor is defective. A similar procedure can be followed to determine whether thermostat 84 is functioning properly to de-energize solenoid 86 so as to stop compressor 50 when a predetermined low air temperature is reached downstream of evaporator 76. The suction pressure on gauge 8 should rise sharply when compressor 50 stops running. If this does not happen at the moment that light 44 goes off, it is a further indication that solenoid 86 is defective.

By checking the condenser or high side pressure on gauge 6 and the low side or suction pressure on gauge 8 while compressor 50 is running, the test engineer can determine if the air conditioning system is functioning properly. If a shortage of refrigerant is indicated by low suction pressure and inadequate cooling of the passenger compartment, additional refrigerant may be added to the system from charging cylinder 20. To accomplish this, it is only necessary to open valves 34 and 40 while keeping valves 36 and 38 closed so that Freon may flow from cylinder 40 through fitting 35, manifold 42, fitting 41 and into the suction valve 83 of compressor 50 through flexible hose 12. If test conditions such as an unduly high condensing or high side pressure indicate the presence of an excessive amount of non-condensible gases such as air in the refrigerant circuit, this situation may be corrected by utilizing evacuating pump 30 to purge the non-condensible gases from the refrigeration circuit. To purge the refrigeration system, valve 34 should be closed and valves 36, 38 and 40 should be open before starting evacuating pump 30 by means of switch 64. The evacuating and charging procedure can also be used to purge a new automobile air conditioner installation and to add the proper amount of refrigerant thereto.

Since air flow over condenser 72 is produced by the combined effects of radiator fan 75 and the forward movement of the automobile, the total condenser air flow will of course vary with the speed of the car. Up to the present time, there has been no adequate means for checking the operation of the refrigeration system, i.e., the high and low side pressures, under the changing conditions of condenser air flow that would be encountered in driving the automobile at different speeds in town and on the highway. My unique arrangement of blowers 46 and 48 on test stand or cabinet 1 permits me to overcome this difficulty previously encountered in testing automobile air conditioners. By bringing cabinet 1 into the position shown in FIGURE 3 with discharge grill 56 directly facing the radiator grill of the automobile to be tested, a supplementary stream of air can be directed over condenser 72 by closing blower switch 62 on test console 4. Rheostat 70 may be adjusted to a particular setting which will cause blower motor 58 to operate at such a speed that blowers 46 and 48 will direct a particular volume of air over condenser 72 corresponding to a particular road speed. Suction and discharge gauges 6 and 8 may then be read in order to see if the air conditioning system is functioning properly at the particular condenser air flow conditions which have been simulated. Rheostat or variable resistor 70 is preferably provided with a scale 71 having a plurality of resistance positions calibrated in miles-per-hour increments. The test engineer can thus simulate any road condition which he desires by setting rheostat 70 at a particular mile-per-hour position and thereby adjusting the speed of blowers 46 and 48 so that they will produce an air flow over condenser 72 corresponding to the ram air effect which would be induced by the movement of the automobile at the speed to which rheostat 70 has been set.

Those skilled in the art will readily appreciate from the foregoing disclosure that I have developed an apparatus and procedure which will greatly simplify and expedite the testing of automobile air conditioners. The provision of rheostat-controlled blowers 46 and 48 mounted so as to be able to directly confront the condenser of an automobile air conditioner permits the complete testing of air-conditioning systems under simulated road conditions in a manner which has not heretofore been possible. I contemplate that those working in the air-conditioning field may think of changes and modifications in my improved air-conditioner test apparatus and methods which will be within the spirit and scope of my invention as defined by the following claims.

What I claim is:

1. Test apparatus for checking the operation of an automobile air conditioner having a compressor, refrigerant condenser, expansion means and an evaporator interconnected in refrigerant flow relationship, the condenser being located adjacent the front grill of the automobile, comprising:
   a portable test stand;
   a drive motor mounted on said test stand;
   blower means rotatably connected to the drive shaft of said motor, said blower means being arranged with the discharge side thereof at such a level and location that when said test stand is moved to a position facing the front of an automobile, said discharge side will be in confronting relationship with the radiator grill of said automobile whereby air discharging from said blower means will pass through said grill and over said refrigerant condenser;
   high and low pressure gauges mounted on a control board on said test stand, said gauges having flexible hoses attached thereto for connection to the high and low pressure sides, respectively, of an automobile air conditioning system.

2. Test apparatus as defined in claim 1, and further including:
   a variable resistor connected in series with said blower drive motor, said resistor being provided with a plurality of resistance positions calibrated in mile-per-hour increments, whereby the speed of said blower may be varied to simulate different air flow conditions over said condenser corresponding to various automobile road speeds.

3. Test apparatus as defined in claim 1, and further including on said test stand:
   a vacuum pump;
   a refrigerant charging cylinder; and
   a charging and evacuating manifold, said manifold having first and second valved fittings attached to said flexible hoses, and third and fourth valved fittings attached thereto which are separately connected to said refrigerant cylinder and said vacuum pump, whereby an automobile air conditioning system may be pressure-checked, evacuated and charged with refrigerant by attaching said flexible hoses to the high and low pressure sides thereof and opening and closing different ones of said valved fittings.

4. A method of testing the operation of an automobile air conditioner having a compressor, refrigerant condenser, refrigerant expansion means, and an evaporator, interconnected in a closed refrigeration circuit, comprising the steps of:
   operating the automobile engine and said compressor drivingly connected thereto;
   directing a supplementary stream of air over said condenser, said supplementary air stream having a volumetric flow rate substantially equal to the air flow that would be induced over said condenser at a predetermined automobile road speed; and
   simultaneously measuring the high and low side pressures in said closed refrigeration circuit upstream and downstream of said compressor.

5. The test method defined in claim 4, and further including:
   varying the volumetric flow of said supplementary air stream to different levels corresponding to different automobile road speeds; and
   simultaneously measuring the high and low side pressures in said closed refrigeration circuit at each of said different volumetric flow levels of said supplementary air stream.

6. Automobile air conditioner test apparatus, comprising in combination with a test stand:
   a suction pressure gauge having a flexible tube connected to the low pressure side of an automobile air conditioning system being tested;
   a temperature gauge having thermocouple lead wires extending therefrom to a location for sensing the temperature of the air being cooled by the automobile air conditioner;
   an indicator light having externally extending lead wires connected in the control circuit of the automobile in series with an air conditioning control thermostat located in the conditioned space, whereby the illumination of said light will indicate the functioning of said thermostat to attempt to actuate the compressor of the air conditioning system at a particular air temperature as indicated by said temperature gauge, and the pressure shown on said suction pressure gauge will indicate if the compressor is running; and variable speed blower means mounted on said test stand with the discharge side thereof at such a level and location as to direct air into and through the radiator grill of an automobile being tested and over the condenser forming a part of an air conditioning system on said automobile.

References Cited

UNITED STATES PATENTS

| 750,749 | 1/1904 | Brush | 73—117 |
| 2,733,600 | 2/1956 | Sahs et al. | 73—168 |

FOREIGN PATENTS

| 659,002 | 12/1963 | Italy. |

JERRY W. MYRACLE, Primary Examiner

U.S. Cl. X.R.

73—345